(12) United States Patent
Tomita et al.

(10) Patent No.: US 11,359,694 B2
(45) Date of Patent: Jun. 14, 2022

(54) DAMPER DEVICE

(71) Applicant: EXEDY Corporation, Neyagawa (JP)

(72) Inventors: Yusuke Tomita, Neyagawa (JP);
Yusuke Okamachi, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 251 days.

(21) Appl. No.: 16/744,464

(22) Filed: Jan. 16, 2020

(65) Prior Publication Data
US 2020/0292027 A1 Sep. 17, 2020

(30) Foreign Application Priority Data
Mar. 15, 2019 (JP) .............................. JP2019-049049

(51) Int. Cl.
| | |
|---|---|
| *F16F 15/123* | (2006.01) |
| *F16F 15/30* | (2006.01) |
| *F16F 15/129* | (2006.01) |
| *F16D 3/12* | (2006.01) |
| *F16D 3/14* | (2006.01) |
| *F16D 7/02* | (2006.01) |

(52) U.S. Cl.
CPC .......... *F16F 15/12353* (2013.01); *F16D 3/12* (2013.01); *F16D 3/14* (2013.01); *F16D 7/025* (2013.01); *F16F 15/1232* (2013.01); *F16F 15/1297* (2013.01); *F16F 15/30* (2013.01); *F16D 2300/22* (2013.01)

(58) Field of Classification Search
CPC ... F16D 3/12; F16D 3/14; F16D 7/025; F16D 2300/22; F16F 15/123; F16F 15/1232; F16F 15/1234; F16F 15/12353; F16F 15/12373; F16F 15/129; F16F 15/1297; F16F 15/134; F16F 15/1343; F16F 15/13453; F16F 15/13469; F16F 15/13492; F16F 15/139; F16F 15/1397
See application file for complete search history.

(56) References Cited

U.S. PATENT DOCUMENTS

2011/0177869 A1* 7/2011 Yoshimura ............ F16F 15/123
464/61.1

FOREIGN PATENT DOCUMENTS

JP 2015-161371 A 9/2015

* cited by examiner

*Primary Examiner* — Richard M Lorence
(74) *Attorney, Agent, or Firm* — United IP Counselors, LLC

(57) ABSTRACT

A damper device includes a first rotor disposed to be rotatable, a second rotor rotatable relative to the first rotor, and a plurality of elastic members configured to elastically couple the first rotor and the second rotor in a circumferential direction. The first rotor includes a first plate and a second plate. The first and second plates are axially opposed to each other, and fixed to be immovable in both axial and circumferential directions. The first plate includes a plurality of first holding portions and a plurality of bent portions. The plurality of first holding portions hold the plurality of elastic members. The plurality of bent portions are provided on an outer peripheral end of the first plate, and bent toward the second plate. The second plate includes a plurality of second holding portions holding the plurality of elastic members together with the plurality of first holding portions.

9 Claims, 7 Drawing Sheets

DAMPER DEVICE

CROSS-REFERENCE TO RELATED APPLICATIONS

This application claims priority to Japanese Patent Application No. 2019-049049, filed Mar. 15, 2019. The contents of that application are incorporated by reference herein in their entirety.

TECHNICAL FIELD

The present invention relates to a damper device.

BACKGROUND ART

A variety of devices are embedded in a drive train of a vehicle in order to transmit power generated in an engine to a transmission. For example, a damper device and a flywheel assembly are assumable as this type of devices. In order to attenuate rotational vibration, these devices are provided with such a damper mechanism as described in Japan Laid-open Patent Application Publication No. 2015-161371.

A damper device described in Japan Laid-open Patent Application Publication No. 2015-161371 includes an input plate, an output plate, a plurality of springs (low stiffness springs and high stiffness springs) and an intermediate plate. The output plate is disposed to be rotatable with respect to the input plate. On the other hand, the intermediate plate is engaged with a plurality of pairs of low stiffness and high stiffness springs, whereby each pair of low stiffness and high stiffness springs is coupled in series.

The input plate described in Japan Laid-open Patent Application Publication No. 2015-161371 includes a pair of disc-shaped plates fixed to be immovable relative to each other in both circumferential and axial directions. The pair of disc-shaped plates is provided with pairs of window portions for holding the pairs of torsion springs in the outer peripheral parts thereof. A torque is transmitted to the pairs of torsion springs through the pairs of window portions.

As described above, the pair of plates, composing the input plate, transmits the torque through the pairs of window portions, and is also rotated. Hence, the pair of plates is required to have a large plate thickness so as to exert high strength against rotation. This becomes an obstacle in attempt to reduce the axial dimension of the damper device.

BRIEF SUMMARY

It is an object of the present invention to enhance the strength of a rotor composed of a pair of plates with a simple configuration.

(1) A damper device according to the present invention includes a first rotor disposed to be rotatable, a second rotor rotatable relative to the first rotor, and a plurality of elastic members elastically coupling the first rotor and the second rotor in a circumferential direction. The first rotor includes a first plate and a second plate. The first and second plates, each having a disc shape, are disposed in axial opposition to each other and are fixed to be immovable in both axial and circumferential directions. The first plate includes a plurality of first holding portions and a plurality of bent portions. The plurality of first holding portions hold the plurality of elastic members. The plurality of bent portions are provided on an outer peripheral end of the first plate, and are bent toward the second plate. On the other hand, the second plate includes a plurality of second holding portions that hold the plurality of elastic members together with the plurality of first holding portions.

In the present damper device, power, when inputted to the first rotor, for instance, is transmitted therefrom to the second rotor through the plurality of elastic members held by the first and second holding portions.

The first rotor herein includes the first and second plates each having a disc shape. The first plate is provided with the plurality of bent portions in the outer peripheral end thereof, and the second plate is fixed to the first plate. Hence, the first rotor as a whole is enhanced in strength against rotation. Because of this, each plate can be reduced in thickness, whereby the damper device can be reduced in axial dimension.

(2) Preferably, the second rotor is disposed axially between the first plate and the second plate.

(3) Preferably, the damper device further includes a third rotor. The third rotor is rotatable relative to the first rotor and the second rotor, and actuates at least two of the plurality of elastic members in series. Besides, preferably, the third rotor is capable of making contact in part with at least one of circumferential end surfaces of the plurality of bent portions.

Here, an angle of relative rotation (torsion angle) between the first plate and the third rotor can be set to fall within a predetermined angular range by causing the third rotor to make contact with at least one of the circumferential end surfaces of the plurality of bent portions. In other words, the plurality of bent portions and the third rotor can realize a stopper mechanism for restricting the torsion angle between the first rotor and the second and third rotors.

(4) Preferably, the third rotor includes an annular portion and a flange. The flange is provided to extend radially outward from the annular portion, and actuates the at least two of the plurality of elastic members in series. Besides, preferably, the first plate and the third rotor are restricted from being rotated relative to each other when the flange makes contact at an outer peripheral part thereof with one of the circumferential end surfaces of the plurality of bent portions.

(5) Preferably, the first plate includes a fixation portion. The fixation portion is formed by bending a distal end of each of the plurality of bent portions radially inward. The damper device further includes a fixation member fixing the fixation portion and the second plate to each other.

(6) Preferably, each of the first plate and the second rotor includes a work hole for fixing the fixation portion and the second plate to each other by the fixation member.

(7) Preferably, the second rotor includes a hub having a tubular shape. Besides, preferably, each of the first and second plates includes a hole in a center part thereof, and are radially positioned by an outer peripheral surface of the hub and an inner peripheral surface of the hole of the each of the first and second plates.

Overall, according to the present invention described above, it is possible to enhance the strength of a rotor composed of a pair of plates with a simple configuration.

DETAILED DESCRIPTION

Figure 1:
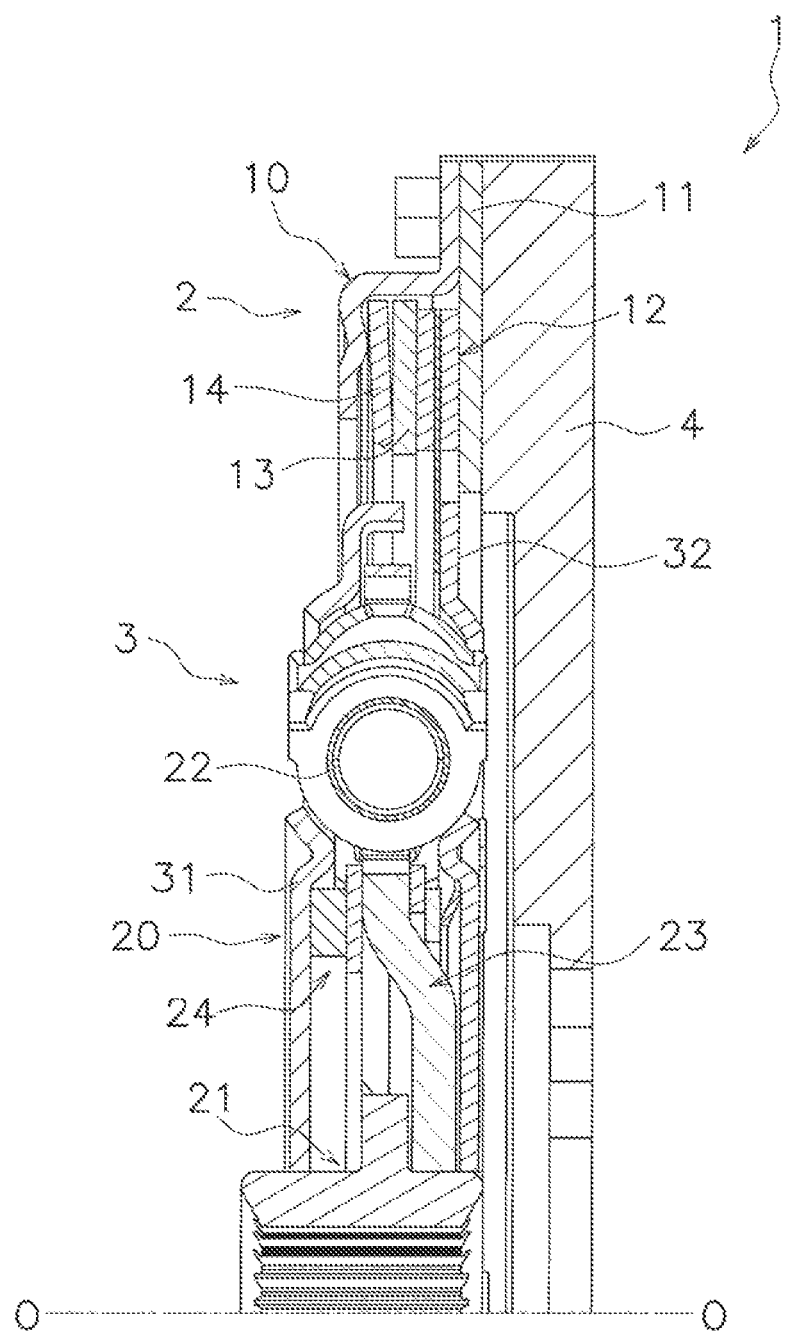
FIG. 1 is a cross-sectional view of a power transmission device including a damper device according to a preferred embodiment of the present invention.
Figure 2:
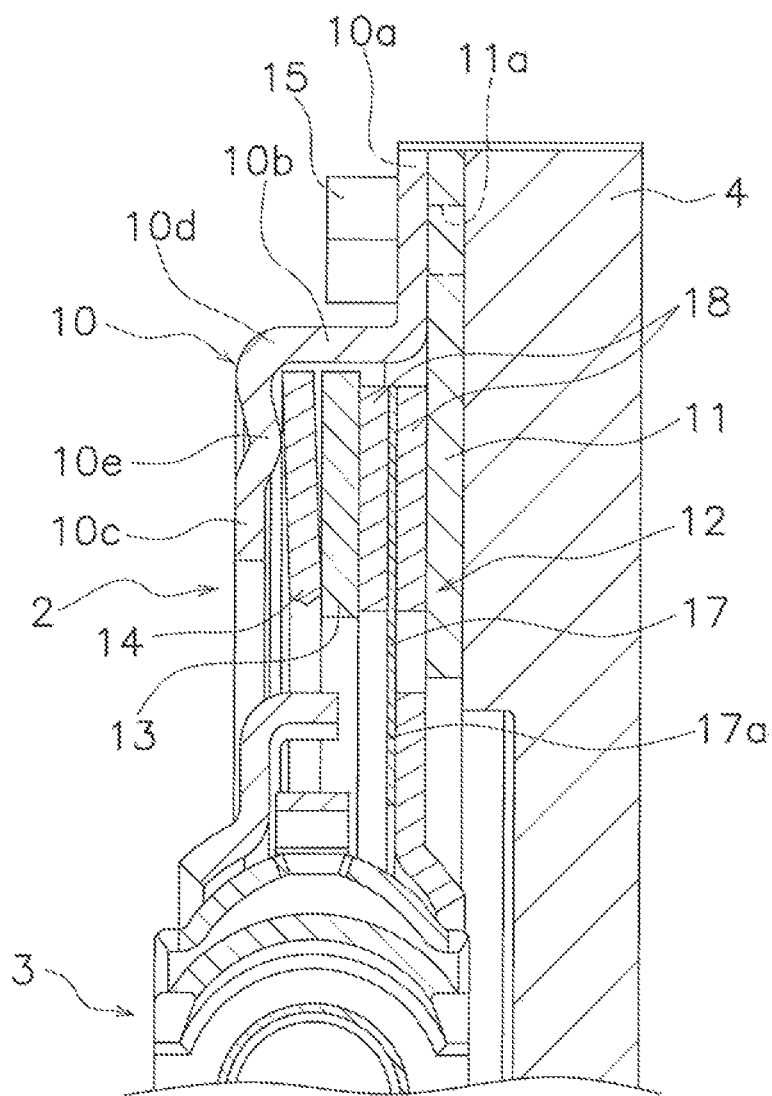
FIG. 2 is a view of a torque limiter device extracted from FIG. 1.

FIG. 1 is a cross-sectional view of a power transmission device 1 including a damper device according to a preferred embodiment of the present invention. FIG. 2 is a front view of the power transmission device 1 that part of members is detached therefrom. The power transmission device 1 is installed in, for instance, a hybrid vehicle. The power transmission device 1 includes a torque limiter device 2 and a damper device 3 that power generated in an engine is inputted thereto through the torque limiter device 2. The engine is disposed on the right side in FIG. 1, whereas an electric motor, a transmission and so forth are disposed on the left side in FIG. 1. In FIG. 1, line 0-0 indicates a rotational axis.

[Torque Limiter Device 2]

The torque limiter device 2 is coupled to a flywheel 4 to which the power generated in the engine is inputted. Additionally, when an excessive torque is inputted from an output side, for instance, the torque limiter device 2 limits the magnitude of the excessive torque to a predetermined value or less so as not to transmit the excessive torque therethrough to the engine. The torque limiter device 2 includes a cover 10, a damper plate 11, a friction disc 12, a pressure plate 13 and a cone spring 14. The friction disc 12, the pressure plate 13 and the cone spring 14 are accommodated in the interior of the cover 10.

FIG. 2 shows an enlarged view of the torque limiter device 2. The cover 10 includes a coupling portion 10a, a tubular portion 10b and a support portion 10c. The coupling portion 10a, the tubular portion 10b and the support portion 10c are integrally processed by stamping. Therefore, the tubular portion 10b is drafted (tapered) by drawing, and thereby slants to the inner peripheral side with separation from the flywheel 4. Additionally, a curved surface portion 12d is provided between the tubular portion 10b and the support portion 10c.

The coupling portion 10a has an annular shape and is coupled to the flywheel 4 by a plurality of bolts 15, while the damper plate 11 is interposed therebetween. The tubular portion 10b extends from the inner peripheral end of the coupling portion 10a to an output side (a side separating from the flywheel 4). The support portion 10c has an annular shape and extends from the distal end of the tubular portion 10b to the inner peripheral side at a predetermined width. The support portion 10c is provided with a support protrusion 10e in a radially intermediate part thereof. The support protrusion 10e has an annular shape and protrudes toward the flywheel 4.

The damper plate 11 has an annular shape and is provided with a plurality of holes 11a in the outer peripheral part thereof. The damper plate 11 is fixed together with the cover 10 to a lateral surface of the flywheel 4 by the bolts 15 that penetrate the holes 11a, respectively. The outer diameter of the damper plate 11 is equal to that of the flywheel 4, and the inner diameter thereof is less than that of each friction material (to be described) of the friction disc 12.

The friction disc 12 includes a core plate 17 and a pair of friction materials 18. The core plate 17 has an annular shape and is provided with a plurality of fixation portions 17a extending from the inner peripheral end thereof further radially inward. The core plate 17 is coupled to the damper device 3 through the fixation portions 17a. The pair of friction materials 18, each having an annular shape, is fixed to the both lateral surfaces of the core plate 17.

The pressure plate 13 has an annular shape, and is disposed in opposition to the damper plate 11 through the friction disc 12. In other words, the friction disc 12 is interposed and held between the damper plate 11 and the pressure plate 13. The inner diameter of the pressure plate 13 is less than that of each friction material 18 of the friction disc 12.

The cone spring 14 is disposed between the pressure plate 13 and the support portion 10c of the cover 10, while being compressed therebetween. The cone spring 14 is supported at the outer peripheral part thereof by the support protrusion 10e of the support portion 10c, and makes contact at the inner peripheral end thereof with the pressure plate 13, whereby the pressure plate 13 is pressed toward the flywheel 4.

When a torque, transmitted between the engine side and the damper device 3 through the torque limiter device 2 configured as described above, exceeds a torque transmission capacity that is set by the torque limiter device 2, slippage occurs in a friction disc 12-related part and the torque to be transmitted through the torque limiter device 2 is limited in magnitude.

In this torque limiter device 2, the tubular portion 10b of the cover 10 is drafted (tapered) to the inner peripheral side with separation from the flywheel 4. Therefore, the output-side end of the tubular portion 10b has a smaller inner peripheral surface diameter than the flywheel 4-side end thereof. Additionally, the tubular portion 10b is provided with the curved surface portion 12d on the output-side end thereof. Because of this, when it is assumed to dispose the friction disc 12 on the support portion 10c side, the friction disc 12 cannot be reliably designed to have a large diameter.

However, in the present preferred embodiment, the friction disc 12 is disposed on the flywheel 4 side in the interior of the cover 10. Hence, the friction disc 12 can be designed to have as large a diameter as possible without being affected by the draft of the tubular portion 10b. Contrarily speaking, the torque limiter device 2 can be made compact in diameter without changing the torque transmission capacity thereof.

Additionally, in the present preferred embodiment, the friction disc 12 is disposed to press the flywheel 4 through the damper plate 11. Now it is assumed, contrarily to the present preferred embodiment, that the friction disc 12 is disposed on the cover 10 side (the support portion 10c side) whereas the cone spring 14 is disposed on the flywheel 4 side. In this assumption, elastic deformation occurs in the support portion 10c of the cover 10 such that an inner peripheral part thereof is opened outward. As a result, chances are that relevant one of the friction materials 18 of the friction disc 12 does not uniformly make contact with the support portion 10c, whereby a desired torque capacity cannot be obtained or abnormal abrasion occurs in the relevant friction material 18. To avoid such troubles, it is required to increase the thickness of a plate member of which the cover 10 is made.

However, in the present preferred embodiment, the friction disc 12 is disposed on the flywheel 4 side, whereas the cone spring 14 is disposed on the cover 10 side (the support portion 10c side). Hence, deformation is unlikely to occur in a surface with which the friction disc 12 makes contact (i.e., a lateral surface of the damper plate 11). Therefore, the entirely of relevant one of the friction materials 18 of the friction disc 12 uniformly makes contact with the damper plate 11, whereby a stable torque capacity can be obtained. Moreover, abnormal abrasion can be inhibited from occurring in the relevant friction material 18 of the friction disc 12.

Incidentally, likewise in the present preferred embodiment, elastic deformation occurs in the support portion 10c of the cover 10. However, this elastic deformation acts as a force for pressing the friction disc 12 together with an urging force of the cone spring 14. Because of this, it is possible to reduce the thickness of the plate member of which the cover 10 is made. Consequently, it is possible to realize compactness in axial size of the torque limiter device 2.

Moreover, the torque limiter device 2, configured as described above, can be easily attached even to a versatile flywheel, i.e., a flywheel without a special shape for attaching a torque limiter.

[Damper Device 3]

Figure 3:
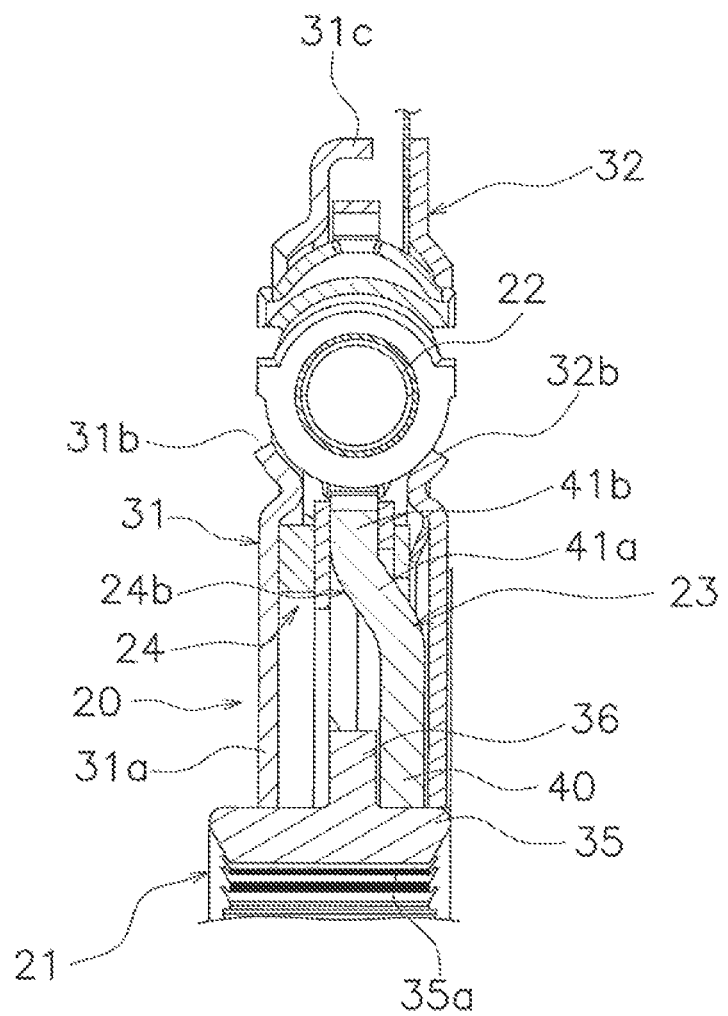
FIG. 3 is a view of the damper device extracted from FIG. 1.

The damper device 3 transmits power, inputted thereto from the torque limiter device 2, to the output side, and attenuates vibration occurring in transmitting the power. FIG. 3 shows the damper device 3 extracted from FIG. 1. The damper device 3 includes an input-side rotor 20 (exemplary first rotor), an output-side rotor 21 (exemplary second rotor), a plurality of torsion springs 22, an intermediate rotor 23 (exemplary third rotor) and a hysteresis generating mechanism 24.

<Input-Side Rotor 20>

The input-side rotor 20 is rotatable about the rotational axis, and includes a first plate 31 and a second plate 32.

Figure 4:
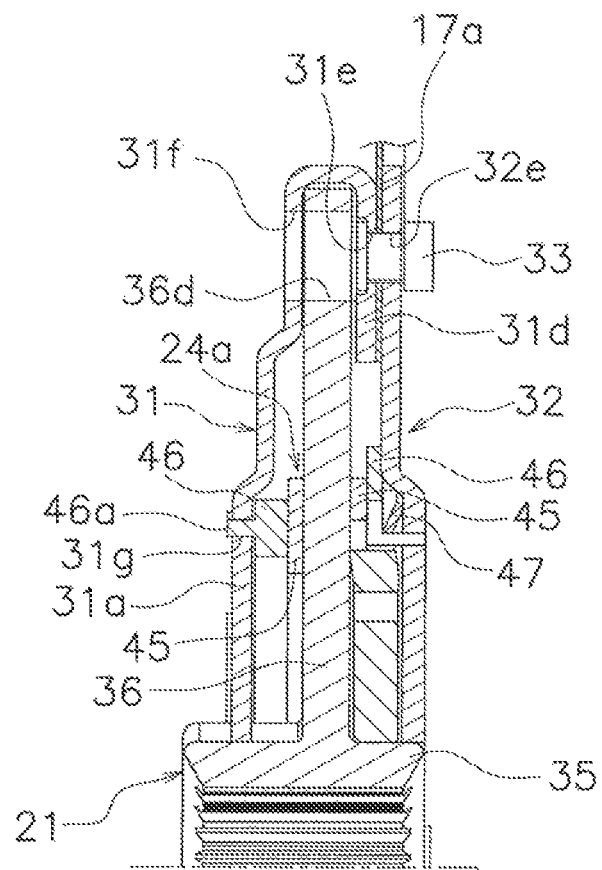
FIG. 4 is a view of a hysteresis generating mechanism shown in FIG. 1.

The first plate 31 includes a disc portion 31a, a plurality of first window portions 31b (exemplary first holding portions) for holding the torsion springs 22, a plurality of bent portions 31c and a plurality of fixation portions 31d (see FIG. 4). It should be noted that FIG. 4 shows a cross-section of the damper device 3, which is taken in a circumferential position different from that in FIG. 1. It should be noted that radial positioning of the first plate 31 is made by the inner peripheral surface of the disc portion 31a and the outer peripheral surface of a tubular hub (to be described) of the output-side rotor 21.

The first window portions 31b are provided in an outer peripheral part of the disc portion 31a. Each first window portion 31b includes a hole and holding portions. The hole is circumferentially elongated and axially penetrates the disc portion 31a. The holding portions are provided on the inner and outer peripheral edges of the hole so as to hold the torsion spring 22. The hole is capable of making contact, at the circumferential end surfaces thereof, with the end surfaces of the torsion spring 22.

Figure 5:
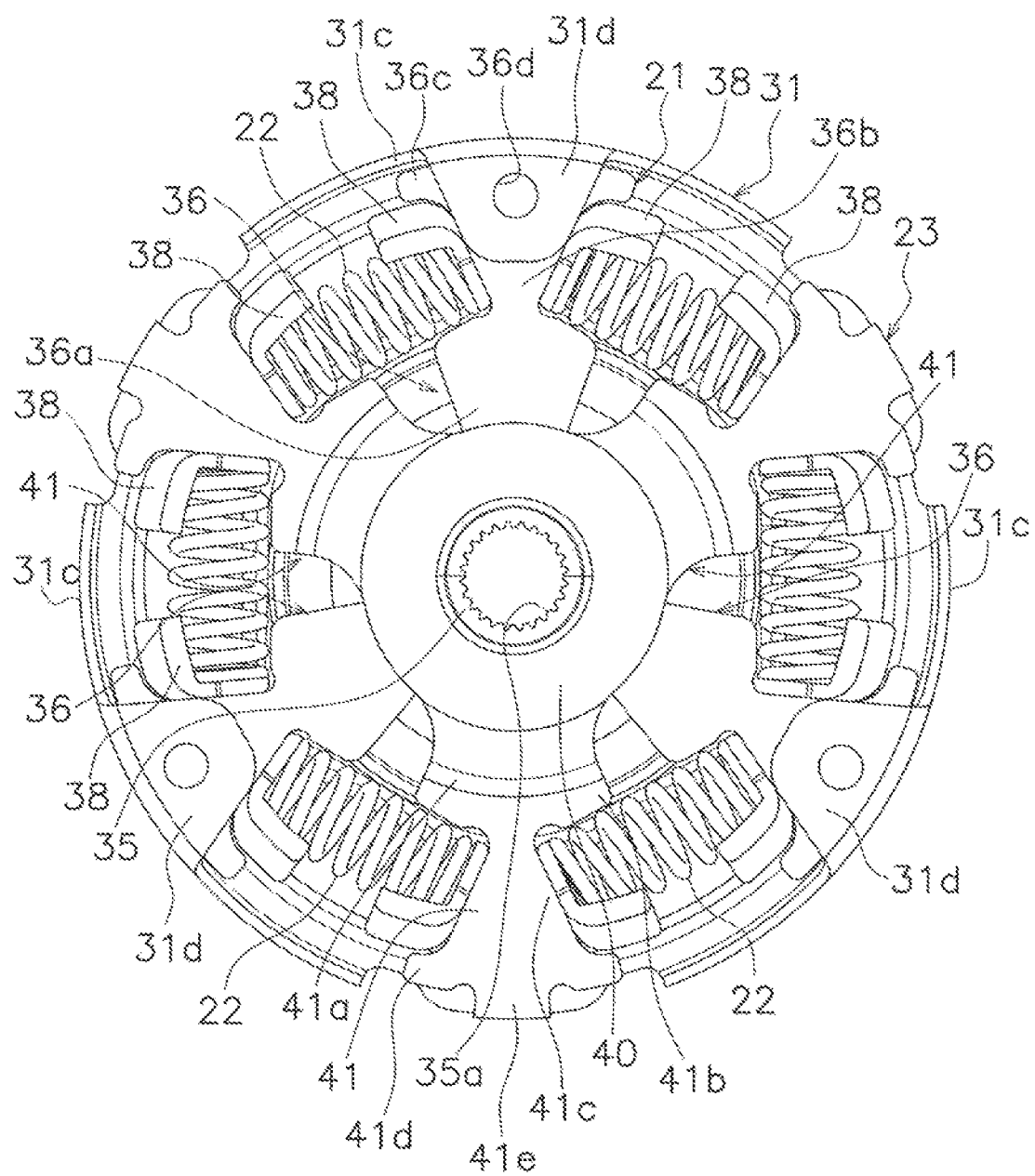
FIG. 5 is a front view of the damper device shown in FIG. 1, from which part of members is detached.

Each bent portion 31c, having an L-shaped cross-section, is formed by bending the outer peripheral end of the disc portion 31a toward the flywheel 4. Enhancement in rotational strength of the first plate 31 is realized by bending the outer peripheral end of the disc portion 31a in the cross-sectional L shape. As shown in FIG. 5, each of the plurality of bent portions 31c is disposed radially outside of a radially outermost edge of each of the plurality of first holding portions 31b and each of the bent portions 31c circumferentially overlaps with at least one of the plurality of first holding portions 31b.

As shown in FIGS. 4 and 5, each fixation portion 31d is formed by bending the distal end of a circumferentially middle part of each bent portion 31c further radially inward.

It should be noted that FIG. 5 is a front view of the damper device 3 that part of members is detached therefrom. Additionally, each fixation portion 31d is provided with a rivet fixation hole 31e. It should be noted that a plurality of rivet swaging holes 31f (exemplary work holes) are provided in the same positions as the rivet fixation holes 31e of the disc portion 31a.

The second plate 32 is disposed in axial opposition to the first plate 31 on the flywheel 4 side of the first plate 31. The second plate 32, having a disc shape, includes a plurality of second window portions 32b (exemplary second holding portions). It should be noted that radial positioning of the second plate 32 is made by the inner peripheral surface of the second plate 32 and the outer peripheral surface of the tubular hub (to be described) of the output-side rotor 21.

The second window portions 32b are provided in corresponding positions to the first window portions 31b of the first plate 31. Each second window portion 32b includes a hole and holding portions. The hole is circumferentially elongated and axially penetrates the second plate 32. The holding portions are provided on the inner and outer peripheral edges of the hole so as to hold the torsion spring 22. The hole is capable of making contact, at the circumferential end surfaces thereof, with the end surfaces of the torsion spring 22. Each second window portion 32b holds the torsion spring 22 together with each first window portion 31b of the first plate 31.

Additionally, the second plate 32 is provided with a plurality of rivet fixation holes 32e in the same positions as the rivet fixation holes 31e of the first plate 31. The first and second plates 31 and 32 are fixed by a plurality of rivets 33 (exemplary fixation members), penetrating the pairs of rivet fixation holes 31e and 32e of the both plates 31 and 32, respectively, so as to be immovable in both axial and circumferential directions. It should be noted that the first and second plates 31 and 32 and the friction disc 12 are fixed to each other, while the fixation portions 17a of the core plate 17 in the friction disc 12 are inserted in between the fixation portions 31d of the first plate 31 and the second plate 32.

<Output-Side Rotor 21>

The output-side rotor 21 is disposed axially between the first plate 31 and the second plate 32. The output-side rotor 21 is rotatable about the rotational axis, and is rotatable relative to the first and second plates 31 and 32. The output-side rotor 21 includes a hub 35 and three flanges 36.

The hub 35, having a tubular shape, is disposed in the center part of the output-side rotor 21. The hub 35 is provided with a spline hole 35a in the inner peripheral part thereof, and the spline hole 35a is coupled to a spline provided on an output-side shaft (not shown in the drawings). As described above, the first and second plates 31 and 32 are radially positioned with respect to the hub 35 by the outer peripheral surface of the hub 35 and the inner peripheral surfaces of the first and second plates 31 and 32.

The three flanges 36 are provided to radially extend from the outer peripheral surface of the hub 35 in a radial shape. The three flanges 36 are disposed at equal angular intervals in the circumferential direction. Each flange 36 includes a hysteresis mechanism attaching portion 36a, a first support portion 36b and a second support portion 36c. The hysteresis mechanism attaching portion 36a, made in the shape of a flat surface, is provided on the outer peripheral side of the hub 35. The first support portion 36b extends radially outward from the hysteresis mechanism attaching portion 36a, and has a smaller circumferential width than the hysteresis mechanism attaching portion 36a. The first support portion 36b make contact, at the both circumferential end surfaces thereof, with spring seats 38. The second support portion 36c is formed by circumferentially extending the both ends of the outer peripheral end of the first support portion 36b. The second support portion 36c makes contact, at the inner peripheral surface thereof, with the spring seats 38.

It should be noted that the second support portions 36c of the flanges 36 are disposed in the same radial positions as the fixation portions 31d of the first plate 31. Each second support portion 36c is provided with a hole 36d (exemplary work hole) axially penetrating therethrough. Rivet swaging of the first and second plates 31 and 32 is made through the holes 36d and the rivet swaging holes 31f of the first plate 31.

<Torsion Springs 22>

The torsion springs 22 are accommodated circumferentially between the plural flanges 36 of the output-side rotor 21 and are held by the first window portions 31b of the first plate 31 and the second window portions 32b of the second plate 32. It should be noted that two torsion springs 22 are disposed between adjacent two of the flanges 36, and the spring seats 38 are disposed on the both end surfaces of each torsion spring 22.

<Intermediate Rotor 23>

The intermediate rotor 23 is rotatable about the rotational axis, and is rotatable relative to the first plate 31, the second plate 32 and the output-side rotor 21. The intermediate rotor 23 is a member for causing two torsion springs 22, disposed between any adjacent two of the flanges 36, to act in series. The intermediate rotor 23 includes an annular portion 40 and three intermediate flanges 41 (exemplary flange).

The annular portion 40 is slid and fitted, at the inner peripheral part thereof, onto the outer periphery of the hub 35 of the output-side rotor 21. In other words, the inner peripheral surface of the annular portion 40 and the outer peripheral surface of the hub 35 make contact with each other, whereby the intermediate rotor 23 is radially positioned with respect to the output-side rotor 21. The annular portion 40 is disposed in axial alignment with the flanges 36 of the output-side rotor 21 on the flywheel 4 side of the flanges 36.

Each of the three intermediate flanges 41 includes an offset portion 41a, a friction portion 41b, a first support portion 41c, a second support portion 41d and a stopper portion 41e.

As shown in FIGS. 3 and 5, the offset portion 41a is a portion that couples the annular portion 40 and the friction portion 41b therethrough. The both lateral surfaces of the friction portion 41b are herein disposed in the same axial positions as those of each flange 36 of the output-side rotor 21. In other words, the flywheel 4-side lateral surface of the friction portion 41b and that of each flange 36 of the output-side rotor 21 are located on one plane. Likewise, the output-side lateral surface of the friction portion 41b and that of each flange 36 of the output-side rotor 21 are located on one plane. The offset portion 41a couples therethrough the annular portion 40 and the friction portion 41b that are disposed in different axial positions.

The first support portion 41c extends radially outward from the friction portion 41b, and has a smaller circumferential width than the friction portion 41b. The first support portion 41c makes contact, at the both circumferential end surfaces thereof, with the spring seats 38. The second support portion 41d is formed by circumferentially extending the both ends of the outer peripheral end of the first support portion 41c. The second support portion 41d makes contact, at the inner peripheral surface thereof, with the spring seats 38.

The stopper portion 41e is provided on the circumferentially middle part of the outer peripheral surface of the first support portion 41c, and protrudes radially outward. The stopper portion 41e is disposed in the circumferential middle of adjacent two of the bent portions 31c of the first plate 31. Additionally, the circumferential end surfaces of the stopper portion 41e are capable of making contact with those of the adjacent two bent portions 31c, respectively.

In other words, the angle of relative rotation between the input-side rotor 20 and the intermediate rotor 23 (furthermore, the output-side rotor 21) is limited to fall within a predetermined angular range by each stopper portion 41e of the intermediate rotor 23 and the adjacent two bent portions 31c of the first plate 31.

[Hysteresis Generating Mechanism 24]

The hysteresis generating mechanism 24 is disposed radially between the hub 35 of the output-side rotor 21 and the torsion springs 22. Besides, the hysteresis generating mechanism 24 is disposed axially between the first plate 31 and both the flanges 36 (specifically, the hysteresis mechanism attaching portions 36a) of the output-side rotor 21 and the intermediate flanges 41 (specifically, the friction portions 41b) of the intermediate rotor 23, while being disposed axially between the second plate 32 and both the flanges 36 of the output-side rotor 21 and the intermediate flanges 41 of the intermediate rotor 23.

Figure 6:
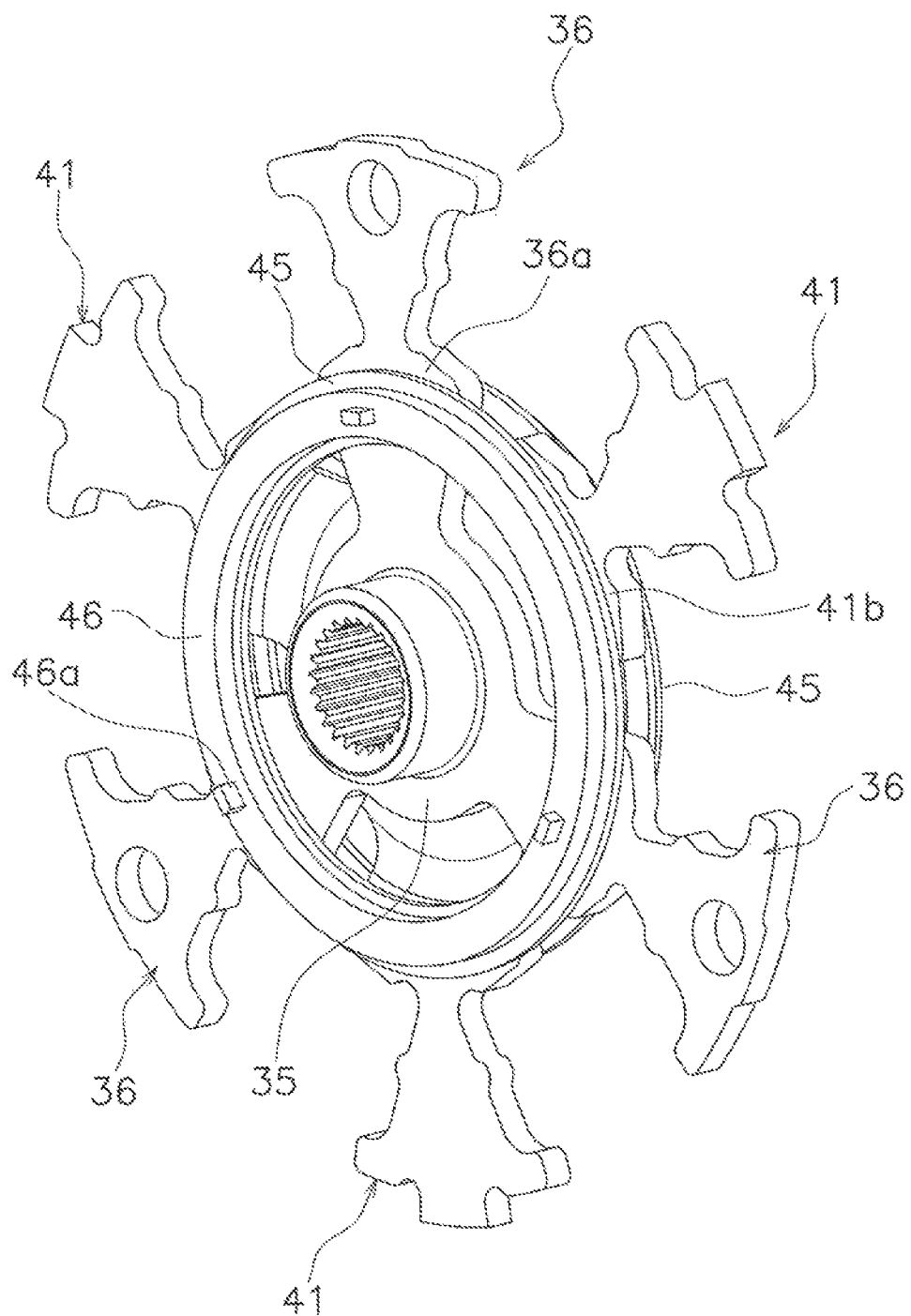
FIG. 6 is an external view of the hysteresis generating mechanism.

As shown in FIGS. 4 and 6, the hysteresis generating mechanism 24 includes two annular disc plates 45, two friction plates 46 and a cone spring 47. The two annular disc plates 45 are different from each other only in terms of dimension, and this is true of the two friction plates 46. Hence, the annular disc plate 45 and the friction plate 46, which are disposed on the first plate 31 side, will be hereinafter explained. It should be noted that FIG. 6 shows the output-side rotor 21, the intermediate rotor 23 and part of the hysteresis generating mechanism 24, which are extracted from the damper device 3.

The annular disc plate 45, having an annular shape, makes contact with the lateral surface of the output-side rotor 21 and that of the intermediate rotor 23. Additionally, the annular disc plate 45 is fixed to the hysteresis mechanism attaching portions 36a of the output-side rotor 21. Therefore, the annular disc plate 45 is non-rotatable relative to the output-side rotor 21, but is rotatable relative to the intermediate rotor 23. It should be noted that albeit not herein described in detail, the annular disc plate 45 is provided with a plurality of fixation portions protruding to the inner peripheral side, for instance, and is fixed at the fixation portions to the output-side rotor 21 by rivets or so forth.

The friction plate 46, having an annular shape, makes contact at the flywheel side lateral surface thereof with the annular disc plate 45, while making contact at the other lateral surface thereof with the first plate 31. Additionally, the friction plate 46 is provided with a plurality of engaging protrusions 46a axially protruding from the first plate 31-side surface thereof. Moreover, the engaging protrusions 46a are engaged with holes 31g provided in the first plate 31. Accordingly, the friction plate 46 is non-rotatable relative to the first plate 31, but is rotatable relative to the annular disc plate 45.

As described above, the annular disc plate 45 and the friction plate 46, disposed on the second plate 32 side, are configured similarly to those disposed on the first plate 31 side. However, the cone spring 47 is attached between the second plate 32 and the friction plate 46 disposed on the second plate 32 side, while being compressed therebetween.

With the configuration described above, friction resistance (hysteresis torque) is generated between the friction plates 46 and the annular disc plates 45 when the torsion springs 22 are compressed and extended by relative rotation between the input-side rotor 20 and the output-side rotor 21. Likewise, a hysteresis torque is generated when relative rotation is produced between the output-side rotor 21 and the intermediate rotor 23 by compression and extension of the torsion springs 22. In other words, the hysteresis generating mechanism 24 includes a hysteresis generating part 24a (see FIG. 4) for generating a hysteresis torque between the input-side rotor 20 and the output-side rotor 21 and a hysteresis generating part 24b (see FIG. 3) for applying a hysteresis torque to the intermediate rotor 23.

[Action]

Power, transmitted from the engine to the flywheel 4, is inputted to the damper device 3 through the torque limiter device 2. In the damper device 3, the power is inputted to the first and second plates 31 and 32 to which the friction disc 12 of the torque limiter device 2 is fixed, and is transmitted to the output-side rotor 21 through the torsion springs 22. Then, the power is further transmitted from the output-side rotor 21 to the electric motor, the transmission, a power generator and so forth disposed on the output side.

Incidentally, in starting the engine, for instance, chances are that an excessive torque is transmitted from the output side to the engine because the output side has a large inertia amount. In such a case, when transmitted to the engine, the torque is limited in magnitude to a predetermined value or less by the torque limiter device 2.

In the damper device 3, when the power is transmitted to the torsion springs 22 from the first and second plates 31 and 32, the torsion springs 22 are compressed. Besides, the torsion springs 22 are repeatedly compressed and extended by torque fluctuations. When the torsion springs 22 are compressed and extended, torsion (displacement) is produced between the first and second plates 31 and 32 and the output-side rotor 21.

The hysteresis generating mechanism 24 is actuated by the torsion between the first and second plates 31 and 32 and the output-side rotor 21, whereby a hysteresis torque is generated. Specifically, relative rotation is produced between the friction plates 46, fixed to the first and second plates 31 and 32, and the annular disc plates 45 fixed to the output-side rotor 21. Hence, friction resistance is generated therebetween. Accordingly, the hysteresis torque is generated between the first and second plates 31 and 32 and the output-side rotor 21.

Moreover, torsion is also produced between the output-side rotor 21 and the intermediate rotor 23 by compression and extension of the torsion springs 22. Because of this torsion, relative rotation is produced between the annular disc plates 45 fixed to the output-side rotor 21 and the friction portions 41b of the intermediate rotor 23, whereby friction resistance is generated therebetween. Accordingly, a hysteresis torque is generated between the output-side rotor 21 and the intermediate rotor 23.

Chances are that, depending on the rotational speed of the engine, the intermediate rotor 23 greatly vibrates due to resonance. However, in the present preferred embodiment, the intermediate rotor 23 can be inhibited from vibrating with a large amplitude due to resonance by the hysteresis torque generated between the output-side rotor 21 and the intermediate rotor 23.

Figure 7:
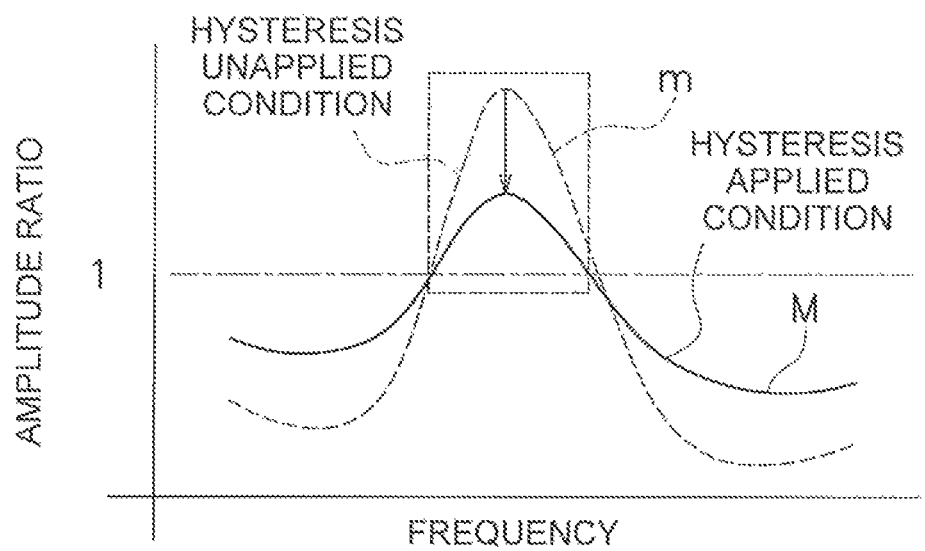
FIG. 7 is a chart showing magnitude of vibration attributed to resonance of an intermediate rotor and magnitude of vibration in the present preferred embodiment.

FIG. 7 shows the magnitude of vibration of the intermediate rotor 23. In FIG. 7, broken line m indicates a condition in which a hysteresis torque is not applied to the intermediate rotor 23, whereas solid line M indicates a condition in which a hysteresis torque is applied to the intermediate rotor 23. As is obvious from FIG. 7, vibration due to resonance can be inhibited in magnitude by applying a hysteresis torque to the intermediate rotor 23.

It should be noted that when the angle of torsion is increased between the first and second plates 31 and 32 and both the output-side rotor 21 and the intermediate rotor 23, one end surface of each bent portion 31c of the first plate 31 and that of each stopper portion 41e of the intermediate rotor 23 make contact with each other. Because of this, the torsion angle between the first and second plates 31 and 32 and both the output-side rotor 21 and the intermediate rotor 23 can be inhibited from reaching a predetermined angle or greater. Therefore, it is possible to avoid a situation that excessive stress acts on the torsion springs 22.

Other Preferred Embodiments

The present invention is not limited to the preferred embodiment described above, and a variety of changes or modifications can be made without departing from the scope of the present invention.

In the aforementioned preferred embodiment, the intermediate flanges 41 of the intermediate rotor 23 and the bent portions 31c of the first plate 31 are configured to make contact with each other so as to compose a stopper mechanism. Alternatively, the flanges 36 of the output-side rotor 21 and the bent portions 31c can be configured to make contact with each other so as to compose a stopper mechanism.

REFERENCE SIGNS LIST

3 Damper device
20 Input-side rotor
21 Output-side rotor
22 Torsion spring
23 Intermediate rotor
31 First plate
31b First window portion (first holding portion)
31c Bent portion
31d Fixation portion
31f Rivet swaging hole (work hole)
32 Second plate
32b Second window portion (second holding portion)
33 Rivet (fixation member)
35 Hub (annular portion)
36 Flange
36d Rivet swaging hole (work hole)

What is claimed is:

1. A damper device comprising:
a first rotor disposed to be rotatable;
a second rotor rotatable relative to the first rotor; and
a plurality of elastic members configured to elastically couple the first rotor and the second rotor in a circumferential direction, wherein
the first rotor includes a first plate and a second plate, the first and second plates each having a disc shape, the first and second plates axially opposed to each other, the first and second plates fixed to be immovable relative to each other in both axial and circumferential directions,
the first plate includes a plurality of first holding portions and a plurality of bent portions, the plurality of first holding portions holding the plurality of elastic members, the plurality of bent portions provided on an outer peripheral end of the first plate, the plurality of bent portions bent toward the second plate, each of the plurality of bent portions disposed radially outside of a radially outermost edge of each of the plurality of first holding portions wherein each of the plurality of bent portions circumferentially overlaps with at least one of the plurality of first holding portions, and the second plate includes a plurality of second holding portions, the plurality of second holding portions holding the plurality of elastic members together with the plurality of first holding portions.

2. The damper device according to claim 1, wherein the second rotor is disposed axially between the first plate and the second plate.

3. The damper device according to claim 1, further comprising:
a third rotor configured to actuate at least two of the plurality of elastic members in series, the third rotor rotatable relative to the first rotor and the second rotor, wherein
the third rotor is further configured to make contact in part with at least one of circumferential end surfaces of the plurality of bent portions.

4. The damper device according to claim 3, wherein
the third rotor includes
an annular portion, and
a flange configured to actuate the at least two of the plurality of elastic members in series, the flange provided to extend radially outward from the annular portion, and
the first plate and the third rotor are restricted from being rotated relative to each other when the flange makes contact at an outer peripheral part thereof with one of the circumferential end surfaces of the plurality of bent portions.

5. The damper device according to claim 1, wherein
the first plate includes a fixation portion, the fixation portion formed by bending a distal end of each of the plurality of bent portions radially inward, the damper device further comprising:
a fixation member fixing the fixation portion and the second plate to each other.

6. The damper device according to claim 5, wherein each of the first plate and the second rotor includes a work hole configured to fix the fixation portion and the second plate to each other by the fixation member.

7. The damper device according to claim 1, wherein
the second rotor includes a hub having a tubular shape, and
each of the first and second plates includes a hole in a center part thereof, the first and second plates radially positioned by an outer peripheral surface of the hub and an inner peripheral surface of the hole of the each of the first and second plates.

8. A damper device comprising:
a first rotor disposed to be rotatable;
a second rotor rotatable relative to the first rotor;
a plurality of elastic members configured to elastically couple the first rotor and the second rotor in a circumferential direction; and
a third rotor configured to actuate at least two of the plurality of elastic members in series, the third rotor rotatable relative to the first rotor and the second rotor, wherein
the first rotor includes a first plate and a second plate, the first and second plates each having a disc shape, the first and second plates axially opposed to each other, the first and second plates fixed to be immovable relative to each other in both axial and circumferential directions,
the first plate includes a plurality of first holding portions and a plurality of bent portions, the plurality of first holding portions holding the plurality of elastic members, the plurality of bent portions provided on an outer peripheral end of the first plate, the plurality of bent portions bent toward the second plate,
the second plate includes a plurality of second holding portions, the plurality of second holding portions holding the plurality of elastic members together with the plurality of first holding portions, and
the third rotor is further configured to make contact in part with at least one of circumferential end surfaces of the plurality of bent portions.

9. A damper device comprising:
a first rotor disposed to be rotatable;
a second rotor rotatable relative to the first rotor; and
a plurality of elastic members configured to elastically couple the first rotor and the second rotor in a circumferential direction, wherein
the first rotor includes a first plate and a second plate, the first and second plates each having a disc shape, the first and second plates axially opposed to each other, the first and second plates fixed to be immovable relative to each other in both axial and circumferential directions,
the first plate includes a plurality of first holding portions and a plurality of bent portions, the plurality of first holding portions holding the plurality of elastic members, the plurality of bent portions provided on an outer peripheral end of the first plate, the plurality of bent portions bent toward the second plate,
the second plate includes a plurality of second holding portions, the plurality of second holding portions holding the plurality of elastic members together with the plurality of first holding portions,
the second rotor includes a hub having a tubular shape, and
each of the first and second plates includes a hole in a center part thereof, the first and second plates radially positioned by an outer peripheral surface of the hub and an inner peripheral surface of the hole of the each of the first and second plates.

\* \* \* \* \*